United States Patent
Huber et al.

(10) Patent No.: US 8,925,861 B2
(45) Date of Patent: Jan. 6, 2015

(54) LOCKING ELEMENT

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 203 days.

(21) Appl. No.: 13/379,947

(22) PCT Filed: Jun. 22, 2009

(86) PCT No.: PCT/EP2009/004486
§ 371 (c)(1), (2), (4) Date: Jan. 31, 2012

(87) PCT Pub. No.: WO2010/149181
PCT Pub. Date: Dec. 29, 2010

(65) Prior Publication Data
US 2012/0119026 A1    May 17, 2012

(51) Int. Cl.
*B64D 9/00* (2006.01)

(52) U.S. Cl.
CPC ...................................... *B64D 9/003* (2013.01)
USPC ..................................... 244/118.1; 244/137.1

(58) Field of Classification Search
CPC ............ B64D 9/00; B64D 9/003; B64D 1/00; B64D 1/10; B64C 1/20; B64C 1/22; B60P 7/00; B60P 7/06; B60P 7/13
USPC ........ 244/137.1, 118.1, 118.2, 137.3; 410/77, 410/79, 69
See application file for complete search history.

(56) References Cited

U.S. PATENT DOCUMENTS

| 4,161,301 A | * | 7/1979 | Beardsley et al. | ......... 244/137.3 |
| 4,372,715 A | | 2/1983 | Naffa | |
| 4,379,668 A | | 4/1983 | Pelletier | |
| 4,401,286 A | | 8/1983 | Naffa | |
| 2007/0253790 A1 | * | 11/2007 | Boggenstall et al. | ........... 410/77 |
| 2010/0290855 A1 | * | 11/2010 | Strien | ............................. 410/77 |

FOREIGN PATENT DOCUMENTS

WO    2004054876    7/2004

OTHER PUBLICATIONS

English translation of Written Opinion of the International Searching Authority in PCT application PCT/EP2009/004486, Jan. 4, 2012.
International Search Report for International Application No. PCT/EP2009/004486 dated Apr. 21, 2010.

* cited by examiner

*Primary Examiner* — Timothy D Collins
*Assistant Examiner* — Richard R Green
(74) *Attorney, Agent, or Firm* — Barnes & Thornburg LLP

(57) ABSTRACT

To secure containers in a cargo bay of an aircraft, locking elements are known comprising locking lugs which can move from a locked position to a rest position. The locking lugs engage in engagement recesses of freight items. On movement of the locking lugs from the locked position to the rest position, the locking lugs can seize in the engagement recesses. A locking element is proposed to which a pair of locking lugs is allocated which in the locked position each have a stop surface which can be brought into engagement on a stop edge of the engagement recess, wherein the locking lugs are mounted mobile such that on movement from the locked position to a rest position, the two stop surfaces separate from the stop edges. As a result the space required in the holding direction for the locking lugs and the risk of seizing of the locking lugs in the engagement recess are substantially reduced.

11 Claims, 7 Drawing Sheets

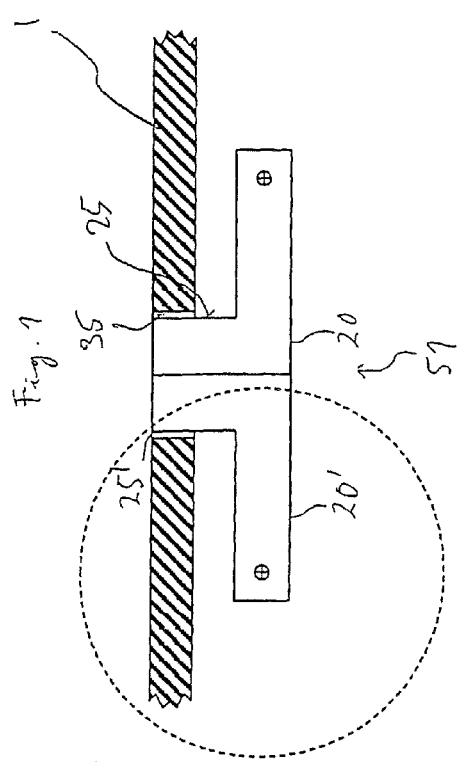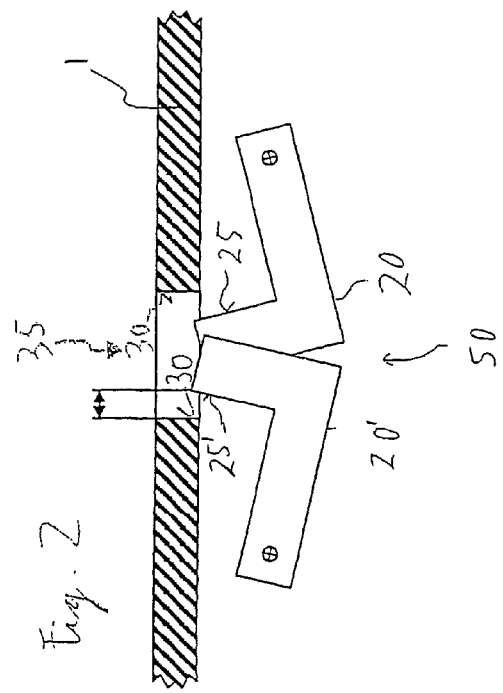

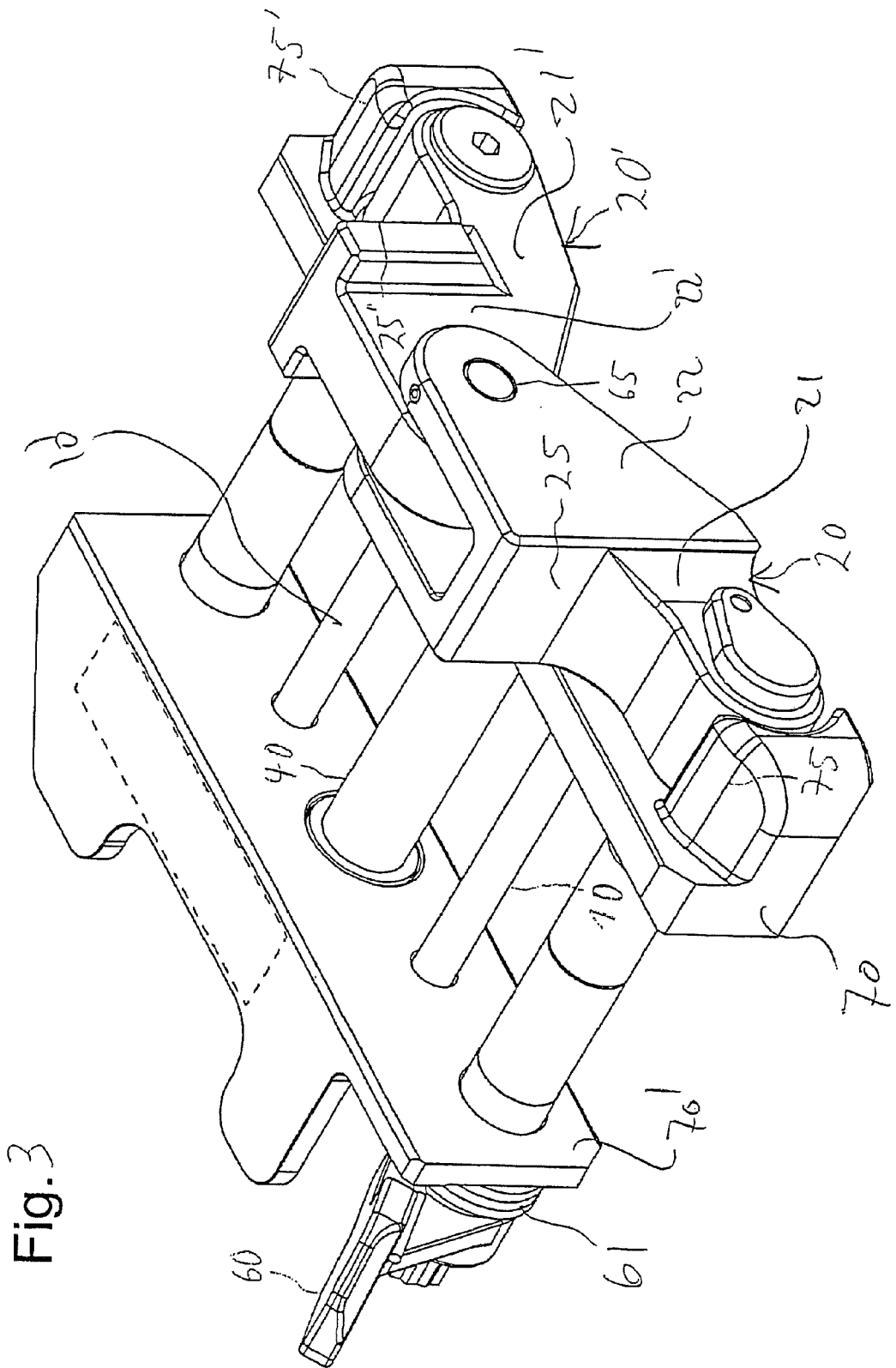

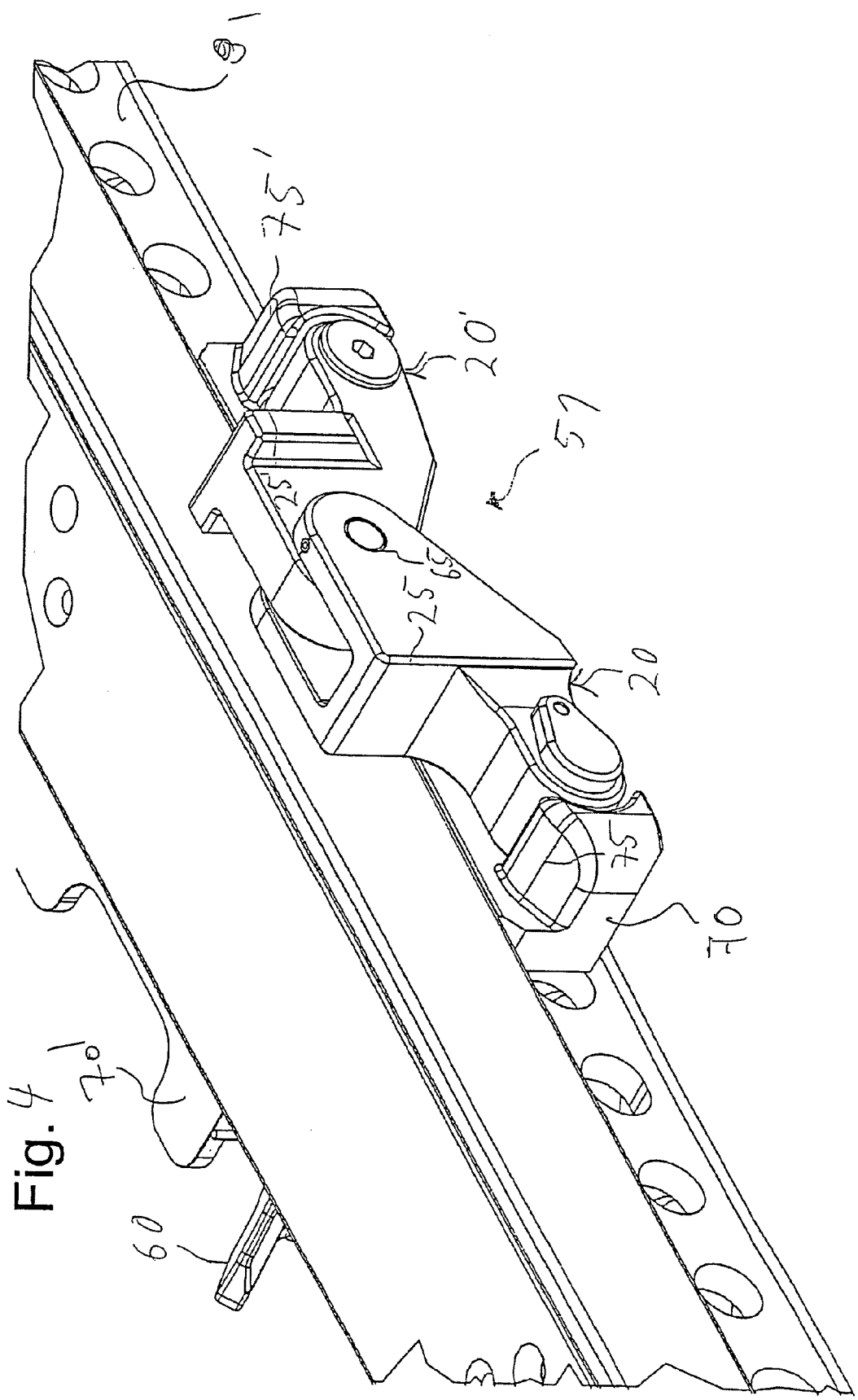

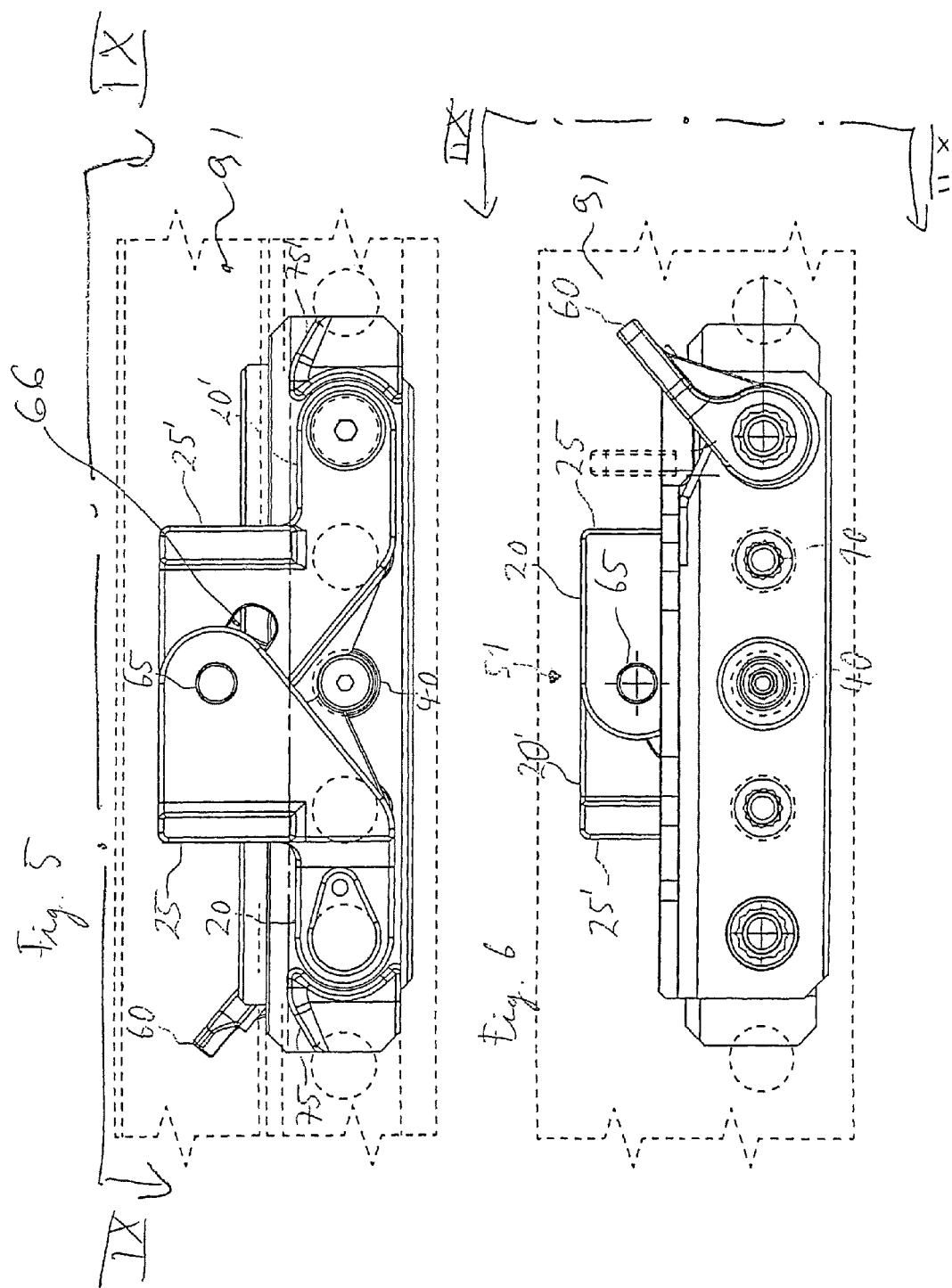

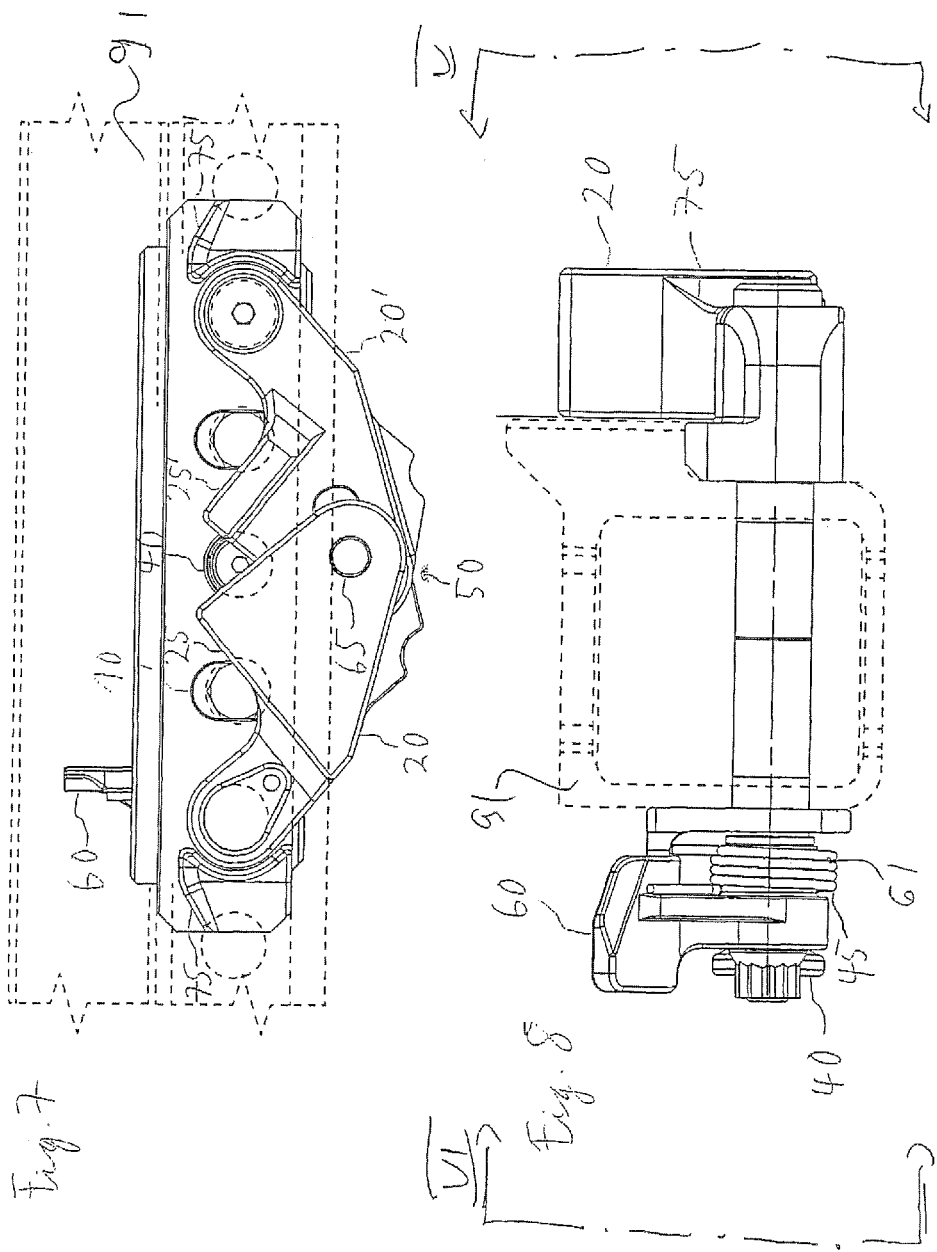

LOCKING ELEMENT

CROSS-REFERENCE TO RELATED APPLICATIONS

This application claims priority to, and is a National Phase application of, pending PCT/EP2009/004486 entitled, Locking Element, filed Jun. 22, 2009, the disclosure of which is hereby incorporated by reference in its entirety.

FIELD OF THE INVENTION

Embodiments in accordance with the invention relate to a locking element for securing containers, pallets or similar freight items in a cargo bay of an aircraft, a cargo bay floor of an aircraft with such locking elements, and the use of such locking elements.

BACKGROUND OF THE INVENTION

Freight items may be secured in the cargo bay of an aircraft in the longitudinal (x), transverse (y) and height direction (z). For this containers or pallets produced to military standards have engagement recesses in which locking lugs of locking elements can engage. It is important that the locking lugs can be withdrawn from the engagement recesses as easily as possible and without risk of the locking lug seizing, in particular when external forces act on the freight items along a holding direction of the locking lug.

Locking hooks are known which swivel in the x-y plane so that their end locking lugs engage in engagement recesses. On withdrawal of the locking lugs from the engagement recess to release the container, the locking lugs can seize and remain stuck in the engagement recess of the container. When they seize, the locking hooks can no longer be moved completely to the rest position and the containers are not released. This seizing can often only be resolved at great cost and with great force. For example seizing can lead to the freight items having to be moved against the unloading travel direction so that the seizing of the locking lugs can be eliminated.

Some embodiments may have a locking element with a clearly reduced risk that the locking lugs will seize on withdrawal of the lugs from the engagement recesses of the freight items.

In some embodiments the stop surfaces which can be brought into engagement with a stop edge of the engagement recesses of the freight item, separate from opposing stop edges on removal of the locking lugs from the locking recesses. The space required by the locking lugs in the holding direction of the locking lugs is therefore reduced and thus the risk of seizing of the locking lugs in the engagement recesses is clearly reduced in comparison with known locking elements. Also if a force acts on the freight item, the risk of seizing of a pair of locking lugs of a locking element in the present invention is substantially reduced in comparison with previously known locking elements.

In one embodiment the locking lugs of a pair are connected together in opposing directions such that movement of one locking lug carries the other locking lug with it. This ensures that both locking lugs of a pair always move simultaneously. Also the two locking lugs can jointly use many parts of the locking element.

In a further embodiment the locking lugs comprise swivel levers with retaining elements on which the stop surfaces are formed. This type of mounting—in contrast to linear mounting—is very simple.

Preferably the locking lugs can swivel in a vertical plane. As a result the locking lugs can be lowered such that the freight items can pass over them. Also in the cargo bay the locking element can remain attached to the rails which are normally provided at the edges there, even if it is not required, without the locking element hindering the movement and/or securing of the freight item.

The locking element can comprise a fixing device to fix the locking lugs in the locked position and/or rest position. This fixing device prevents unintentional movement of the locking lugs from one position to the other. In one embodiment the fixing device comprises at least one fixing spring element for securing the fixing device in the locked position and/or rest position of the locking lugs. This has amongst others the advantage that the locking lugs can be fixed in the locked position and/or rest position without further action.

The locking element in a further embodiment has at least one movement spring element for movement of the locking lugs from the locked position to the rest position. As a result the locking lugs, if for example not fixed in the working position by the fixing device, are lowered into the rest position which allows the containers to pass over the locks.

In a further embodiment the locking element has at least one starting chamfer in the longitudinal direction of the aircraft (x). The starting chamfers ensure that the freight item does not touch the locking lugs when it is moved below a normal movement plane on the locking element. The starting chamfers convert the horizontal movement of the freight item into a vertical movement and thus raise the freight item if necessary, which prevents damage to the locking element.

The locking lugs can be formed such that parts of a second locking lug can be held in a cavity of a first locking lug such that the stop surfaces are arranged parallel and aligned in the locked position. This not only reduces the space required for the locking lugs in the holding direction, but reduces the common extent of the two locking lugs in each direction.

The cargo bay floor of an aircraft can comprise rails attached to the edges of the cargo bay floor and running in the longitudinal direction of the aircraft (x), and locking elements which are mounted on the rails to secure containers on the cargo bay floor and comprise such elements of the type described here for securing containers to military standards. Also mounted on the cargo bay floor are X/Z locking elements to secure containers to civil standards. As a result containers to military and civil standards can be secured both simultaneously and in successive transport flights.

Locking elements of the type described in the present application for securing containers to military standards in the longitudinal direction of the aircraft (x) at the edges of a cargo bay of an aircraft can be used together with locking elements for securing containers to civil standards on the cargo bay floor. As a result containers to military and civil standards can be used both simultaneously and in successive transport flights.

BRIEF DESCRIPTION OF THE DRAWINGS

The invention is described in more detail below with reference to drawings of an embodiment example. These show:

FIG. 1 a diagrammatic side view of two locking lugs of a locking element in the locked position in an engagement recess of a freight item;

FIG. 2 a diagrammatic side view of the arrangement in FIG. 1 in the rest position outside an engagement recess of a freight item;

FIG. 3 a perspective view of a locking element with a pair of locking lugs in the locked position;

FIG. 4 a perspective view of the locking element according to FIG. 3 which is attached to a rail;

FIG. 5 a side view of the locking element according to FIG. 3/4 in the locked position;

FIG. 6 a further side view of the locking element according to FIG. 5 from the opposite side;

FIG. 7 the locking element according to FIG. 5 in rest position;

FIG. 8 a view of the locking element along line IIX-IIX of FIG. 6;

DETAILED DESCRIPTION

Figure 9:
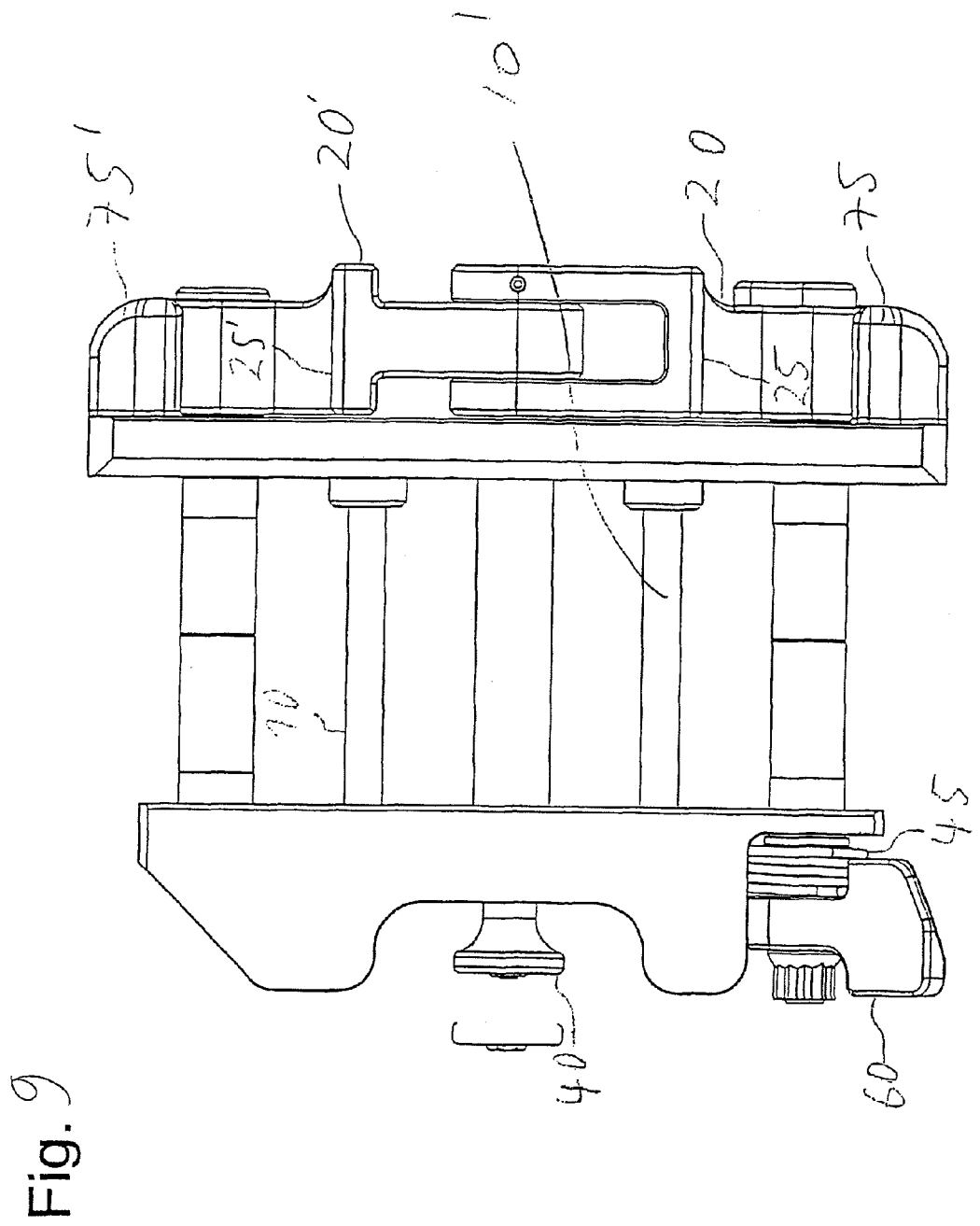
FIG. 9 a view of the locking element along line IX-IX of FIG. 5.

In the description which follows, the same reference numerals are used for parts which are the same or have a similar function.

FIG. 1 shows a diagrammatic side view of two locking lugs 20, 20' in locked position 51 in an engagement recess 35 of freight item 1. The locking lugs 20, 20' each have a stop surface 25, 25' which in the locked position 51 point in opposite directions. Each of the two locking lugs 20, 20' can be brought with stop surface 25, 25' to a stop edge 30, 30' of the engagement recess 35 of the freight item, pallet or similar freight 1. This means that the respective stop surface 25, 25' in the locked position lies close to the respective stop edge 30, 30' of freight item 1. Typically locking lugs 20, 20' secure the freight items in a holding direction which corresponds to the longitudinal direction of the aircraft (x).

FIG. 2 shows a diagrammatic side view of locking lugs 20, 20' which in the rest position 50 have been moved out of the engagement recess 35 of the freight item. On movement of the locking lugs 20, 20' out of the locked position 51 into the rest position 50, the two stop surfaces 25, 25' move away from the opposing stop edges 30, 30' of the engagement recess 35. As a result the space required for the locking lugs 20, 20' in the holding direction is reduced.

FIG. 3 shows a perspective view of a locking element. The locking element comprises the pair of locking lugs 20, 20'. Locking lugs 20, 20' can comprise swivel levers 21, 21' with retaining elements 22, 22' on which are formed the stop surfaces 25, 25'. The locking lugs 20, 20' in FIG. 3 are in the locked position 51. They can be moved from the locked position into the rest position 50. Furthermore the locking lugs 20, 20' of one pair are connected together by connecting pin 65 and a slide recess 66 (FIG. 5) in opposing directions such that movement of the one locking lug 20, 20' carries the other locking lug 20, 20' with it.

The locking element comprises preferably a fixing rod 40 with which the locking lugs 20, 20' can be fixed in the locked position 51. The fixing device 40 is pre-tensioned in a locked position (see FIG. 9) by a spring not shown. Thus the locking lugs 20, 20' in the locked position 51 can secure the freight items. The locking element furthermore comprises two mounting plates 70, 70' which are connected together via fixing devices 10, 10' which simultaneously serve for mounting the locking element on a rail 91 (see FIGS. 4, 8). By activating a movement lever 60 which is pre-tensioned in the rest position via a spring 61, the locking lugs 20, 20' can be moved out of the rest position 50 into the locked position 51.

The embodiment shown in FIG. 3 of a locking element comprises two starting chamfers 75, 75' which ensure that a freight item does not damage the locking lugs 20, 20' or their pivot joints if moved below a normal movement plane on the locking element. The two starting chamfers 75, 75' convert the horizontal movement of the freight item into a vertical movement and thus raise the freight item.

In FIG. 4 the locking element is attached to a rail 91 on the cargo bay floor. The rail 91 is a (conventional) outer guide rail which runs in the longitudinal direction of the aircraft. In FIG. 4 the two locking lugs 20, 20' are in the locked position 51 to secure freight items (not shown here). The stop surfaces 25, 25' of the two locking lugs 20, 20' in the locked position 51 point in the longitudinal direction of the aircraft and in two mutually opposing directions.

Preferably the freight item with locking lugs 20, 20' is secured along the longitudinal direction of the aircraft by the locking lugs 20, 20' engaging in engagement recesses 35 of the freight items. The freight item is preferably secured by locking elements only at the outer rails in the longitudinal direction of the aircraft (x).

FIG. 5 shows a side view of the locking element. The two locking lugs 20, 20' are fixed in the locked position by the fixing device 40. The locking device 40 here comprises a locking rod 40 which is mobile transverse to the swivel plane of the locking lugs 20, 20' and can be moved under the locking lugs 20, 20'.

FIG. 6 shows a side view of the locking element from the opposite direction from FIG. 5. The fixing device 40 in the form of a fixing rod extending over the complete width of the locking element can clearly be seen.

In FIG. 7 the two locking lugs 20, 20' of the locking element shown are in the lowered rest position 50. In this position freight items can pass over the locking lugs 20, 20' and the locking element. This has the advantage that the locking element can remain attached in the cargo bay or on the rails 91 even when it is not required without hindering the movement and/or securing of the freight items. For example the locking elements can be attached to the rails 91 such that the distance between two locking lugs 20, 20' of two different locking elements at the defined positions correspond to the standards of military freight items. If in such a case freight items to civil standards are to be transported in the cargo bay, the locking elements can remain attached in the cargo bay. The locking lugs 20, 20' can be swivelled into rest position 50 and the locking element does not hinder the loading and fixing of freight items to civil standards.

FIG. 8 shows a longitudinal view of a locking element. The locking element preferably comprises a movement spring element 45. The movement spring element 45 moves the locking lugs 20, 20' out of the locked position 51 into the rest position 50 if the fixing device 40 does not fasten the locking lugs 20, 20'. By activation of movement lever 60, the locking lugs 20, 20' can be moved out of the rest position 50 into the locked position 51. The position of the rail 91 to which the locking element is typically attached is indicated by dotted lines in FIG. 8. The freight items are moved in FIG. 8 on the right of the rail and secured in the longitudinal direction of the aircraft (x) by the locking lugs 20 shown in the locked position 51.

FIG. 9 shows a top view of a locking element. It is evident that in this embodiment the locking lugs 20, 20' are formed such that parts of a first locking lug can be held in a second locking lug. The fixing device 40 in FIG. 9 has fixed the locking lugs 20, 20'. The position of the fixing device 40 for releasing the locking logs 20, 20' is shown in FIG. 9.

Figure 10:
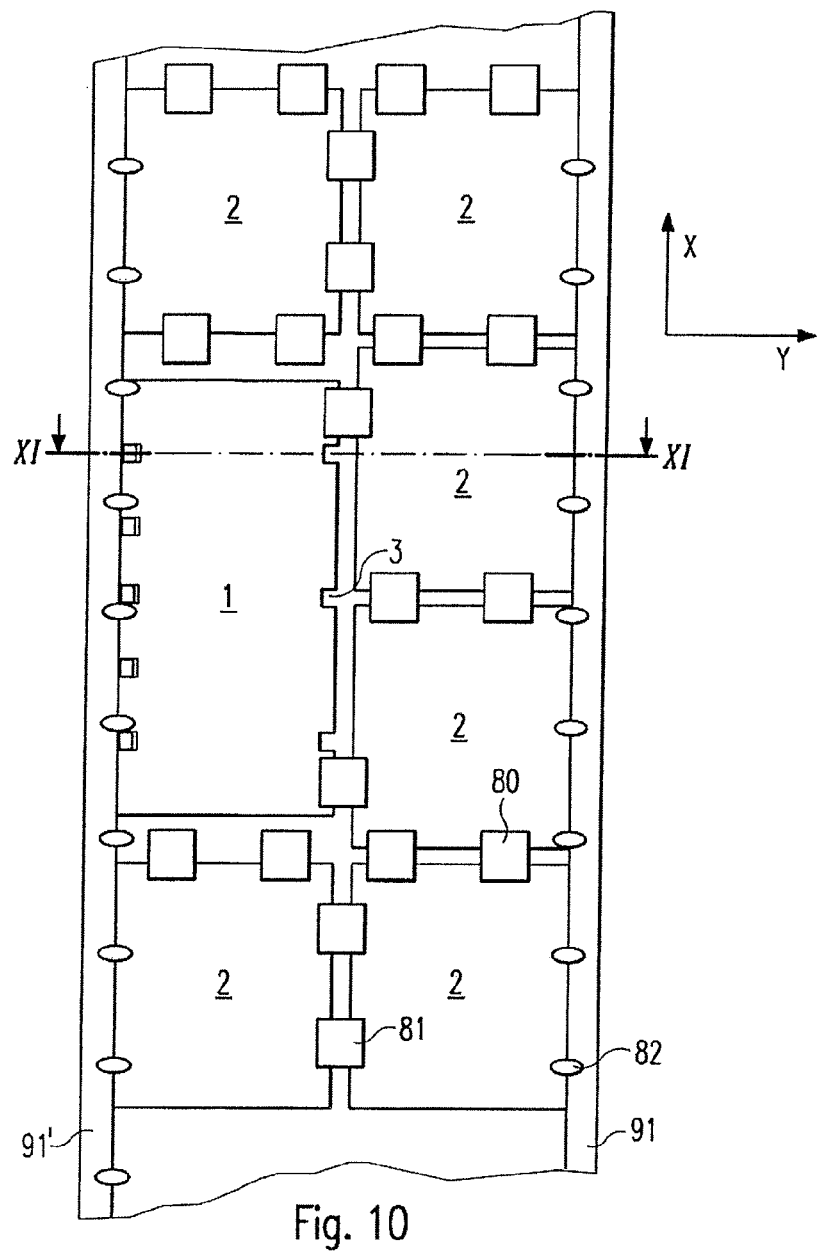
FIG. 10 a top view of a cargo bay floor with secured freight items.

FIG. 10 shows part of a cargo bay floor of an aircraft with freight items 2 to civil standard sizes and a freight item 1 to military standards. The cargo bay floor extends in the longitudinal (x) and transverse direction (y) of the aircraft. The freight items 2 to civil standards are secured to the cargo bay floor 90 by X/Z lock 80, Y/Z lock 81 and Z lock 82. Freight item 1 to military standards is secured in the longitudinal direction of the aircraft by Y/Z lock 81 and Z lock 82 and by so-called X-locking elements 95, being locking elements of the type described in the present invention with locking lugs 20, 20' in the locked position 51, wherein the locking lugs 20, 20' engage in recesses 3 on the freight item 1.

Figure 11:
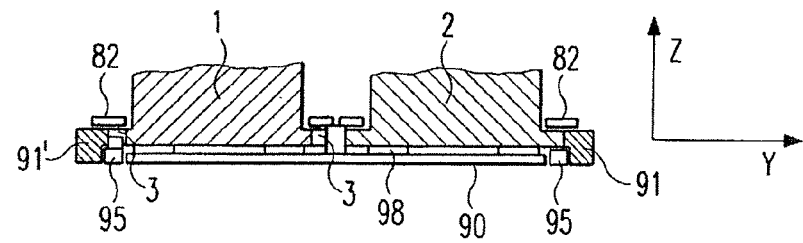
FIG. 11 a cross-section of the arrangement in FIG. 10 along line XI-XI of a cargo bay floor.

FIG. 11 shows a cross-section of a cargo bay floor 90 along line XI-XI in FIG. 10. The cargo bay floor 90 comprises, as well as locking elements 80 for securing freight items to civil standards in the X direction and rollers 98 for moving freight items 1 and 2, also locking elements 95 of the type cited above for securing freight item 1 to military standards. The locking lugs 20, 20' of the locking elements of the type cited above which are located at points at which freight items 2 to civil standards are secured, are in the lowered rest position (FIG. 11 right) in order not to hinder the movement and securing of freight items 2 to civil standards. Typically the locking elements 95 (FIG. 11 left) of the type cited above for securing freight items 1 to military standards are attached to side rails 91 which are normally provided in the cargo bay.

LIST OF REFERENCE NUMERALS 1, 2 Freight item
3 Recess
10, 10' Fixing device
12 Rail
20, 20' Locking lug
21, 21' Swivel lever
22, 22' Retaining element
25, 25' Stop surface
30, 30' Stop edge
35 Engagement recess
40 Fixing device
45 Movement spring element
50 Rest position
51 Locked position
60 Movement lever
61 Spring
65 Connecting pin
66 Slide recess
70, 70' Mounting plate
75, 75' Starting chamfers
80 X/Z lock
81 Y/Z lock
82 Z lock
90 Cargo bay floor
91 Side rails
95 X-locking element
98 Rollers

The invention claimed is:

1. A locking element for securing containers or pallets in a cargo bay of an aircraft,
   wherein the containers or pallets comprise engagement recesses with opposing stop edges in which locking lugs engage in a locked position and configured to be moved back into a rest position,
   wherein each locking element is allocated a pair of locking lugs which in the locked position can each be brought with a stop surface into engagement on a stop edge of the engagement recess, wherein the locking lugs are mounted mobile such that the two stop surfaces separate from the stop edges on movement from the locked position into the rest position,
   the locking lugs of a pair are connected together in opposing directions via a connecting pin in a slide recess formed in one of the lugs such that movement of one locking lug carries the other locking lug with it,
   wherein the locking element comprises two permanently fixed rotating axes wherein each of said locking lugs of said pair rotates around one of said permanently fixed rotating axes, respectively, when being moved from the locked position into the rest position.

2. A locking element according to claim 1, wherein that the locking lugs comprise swivel levers with retaining elements on which are formed the stop surfaces.

3. A locking element according to claim 1, wherein the locking lugs can be swivelled in a vertical plane.

4. A locking element according to claim 1, comprising at least one fixing device for fixing the locking lugs in the locked position and/or the rest position.

5. The locking element according to claim 4, wherein the fixing device comprises at least one fixing spring element for engagement of the fixing device in at least one of the locked position and the rest position of the locking lugs.

6. The locking element according to claim 1, wherein in that at least one movement spring element is provided to move the locking lugs out of the locked position into the rest position.

7. The locking element according to claim 1, comprising at least one starting chamfer in the longitudinal direction of the aircraft (x).

8. The locking element according to claim 1, comprising at least one movement lever to move the locking lugs out of the rest position into the locked position.

9. The locking element according to claim 1, wherein the locking lugs are formed such that parts of a second locking lug can be held in a cavity of a first locking lug such that the stop surfaces in the locked position are arranged parallel and in alignment.

10. A cargo bay floor of an aircraft with rails attached to the edges of the cargo bay and running in the longitudinal direction of the aircraft (x), and locking elements which are attached to the rails to secure containers on the cargo bay floor and comprise such elements to secure containers to military standards according to claim 1, and X/Z locking elements are provided which are fixed to a floor of the cargo bay to secure containers to civil standards.

11. The use of locking elements according to claim 1, at the edges of a cargo bay of an aircraft to secure containers to military standards on the cargo bay floor in a longitudinal direction of the aircraft (x) together with locking elements to secure containers to civil standards on the cargo bay floor.

* * * * *